Oct. 16, 1928.

W. E. PRESCOTT 1,687,694

APPARATUS FOR MEASURING AND FEEDING PLASTIC SUBSTANCES

Filed April 26, 1923    3 Sheets-Sheet 1

Inventor.
William Edward Prescott.
Attorney

Oct. 16, 1928.

W. E. PRESCOTT

APPARATUS FOR MEASURING AND FEEDING PLASTIC SUBSTANCES

Filed April 26, 1923   3 Sheets-Sheet 2

Oct. 16, 1928.  
W. E. PRESCOTT  
1,687,694  
APPARATUS FOR MEASURING AND FEEDING PLASTIC SUBSTANCES  
Filed April 26, 1923   3 Sheets-Sheet 3

Inventor.  
William Edward Prescott.  
Attorney.

Patented Oct. 16, 1928.

1,687,694

UNITED STATES PATENT OFFICE.

WILLIAM EDWARD PRESCOTT, OF LONDON, ENGLAND, ASSIGNOR TO BAKER-PERKINS COMPANY, INC., OF WHITE PLAINS, NEW YORK.

APPARATUS FOR MEASURING AND FEEDING PLASTIC SUBSTANCES.

Application filed April 26, 1923, Serial No. 634,886, and in Great Britain May 3, 1922.

This invention relates to apparatus for measuring, and feeding plastic substances, more particularly adapted for use in the moulding of chocolate and particularly for moulding separate or individual "bars" of said chocolate where a measured quantity is deposited for each bar.

Whilst the invention is, as just said, particularly adapted for the production of single or separated chocolate bars, it is equally applicable to a variety of uses where definite or measured quantities of plastic material are required to be forced or fed for delivery into moulds or otherwise. The invention is, however, hereinafter described as an example for the moulding of chocolate bars as aforesaid.

The primary feature of the invention consists in means adapted to both measure and feed a quantity of plastic material (hereinafter referred to as chocolate) sufficient to fill or charge to the required extent a single mould, and this is performed by means of a pair of toothed, fluted or corrugated wheels or rolls located in a container for the chocolate, and the teeth, flutes or corrugations of which are of such shape as to feed or propel a constant or uniform quantity of the chocolate in proportion to their angular movement. The teeth of said rollers closely intermesh, for example along a horizontal line passing through their axes, and certain of said teeth bear closely against the base of the container in which the rollers are mounted. The required amount of chocolate is fed from the container through a discharge aperture, by rotating the rollers through a given angle, which is determined by the capacity of the mould to be filled or charged, or in other words, the quantity of chocolate to be delivered to the mould.

The rollers are geared together and one of same is a positively rotated interrupted gear, variable drive apparatus or any other appropriate device capable of the necessary adjustment to vary the degree of revolution according to the quantity of chocolate to be fed at each movement.

The discharge aperture of the container may be provided with a die, nozzle or equivalent with which may be associated a cut off valve, or other means for stopping the flow of chocolate to the mould after the rolls have stopped.

A pair of rollers as above described is used for each mould, that is to say, for production of single bars of chocolate, but as in practice multiple moulds would usually be used, each containing a number of mould sections each for the production of a separate bar, it may be necessary to separate each pair of rollers from that adjacent thereto in the container so that each pair may act on a separate quantity of chocolate, and for this purpose where necessary a convenient method is to provide in the container a number of partition plates arranged between the pairs of rollers, said plates being suitably attached to the discharge die which is removably applied to the container and said plates being so shaped as to fit the axles of the rollers or slots formed therein so as to properly provide for each pair of rollers a measuring and forcing chamber individual thereto. The die and partition plates can thus be inserted and removed as a unit or the said division plates may be fitted to the container and in this case only the die would be removable.

As an alternative or in the production of single "bars" only, separate containers may be used each containing and having closely fitting therein but a single pair of rollers arranged as above described and with suitable discharge aperture die and cut-off arrangements.

An embodiment of the invention given as an example is illustrated in the accompanying drawings in which:—

Fig. 4 is a sectional detail view on the line 4—4 of Fig. 1.

Figure 3:
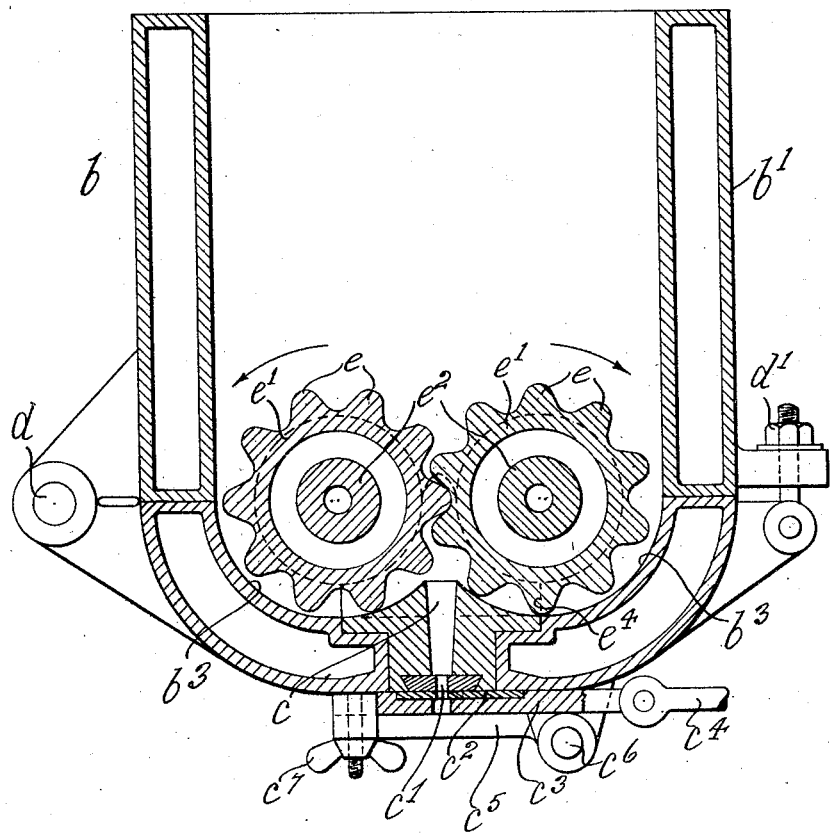
Fig. 3 is a vertical section of the container and one pair of measuring and feeding rollers.

The machine illustrated is one for the moulding of chocolate bars in which the moulds are moved along on a conveyor $a$ passing over a table or base $a^1$ carried by side frames $a^2$, the conveyor being intermittently fed to pass the moulds in succession below the chocolate container $b$, (see more particularly Fig. 3). This container as shown at $b^1$ is jacketed for reception of a tempering medium such as hot water which is conveyed to the jacket from any suitable source as by means of a pipe $b^2$. The base of the container is doubly curved or concaved as at $b^3$ and between these curved surfaces is provided with an outlet or nozzle $c$ which communicates with a discharge aperture in a die plate $c^1$ which aperture is adapted to be opened and closed by a perforated slide $c^2$ carried by a plate $c^3$ operated by a rod $c^4$ as hereinafter explained. The said plate $c^3$ is held in position by a clamping bar $c^5$ pivoted at $c^6$ and secured by wing bolt $c^7$ in such a manner that when necessary all said parts can be readily removed for cleaning, replacement or substitution.

Figure 1:
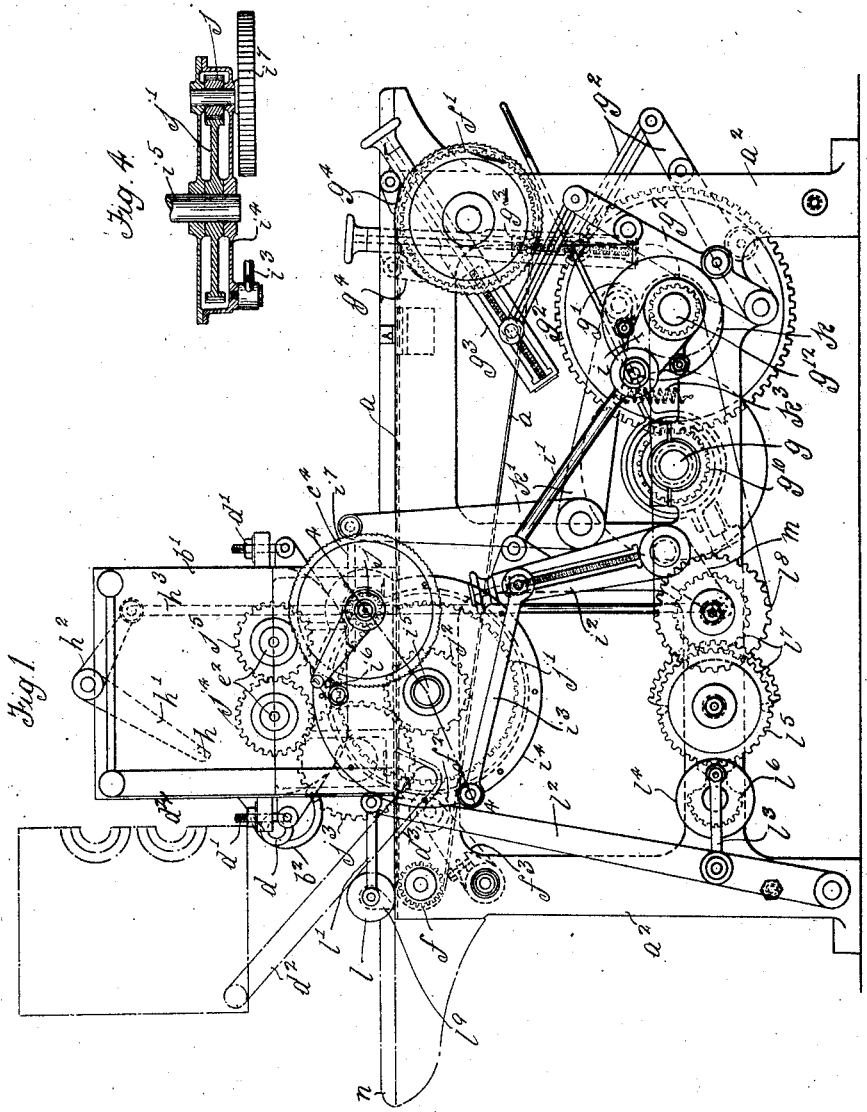
Fig. 1 is a side elevation of the machine.

The container $b$ is suitably made in two parts, as shown, the upper part being hinged at $d$ and secured in operative position by bolts $d^1$ but capable of being swung about its pivot into the position shown in broken lines in Fig. 1 in which position it is supported by a bar $d^2$ (of which there may be one at each side of the container) which in turn is supported at its lower end in an angle bracket or rest $d^3$.

Figure 2:
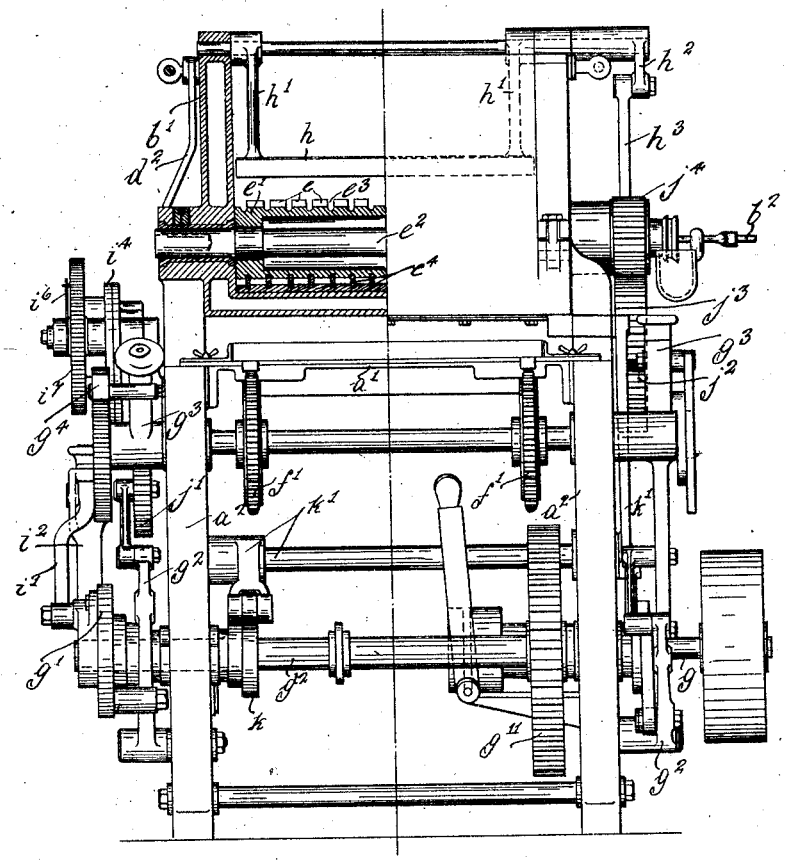
Fig. 2 is an end elevation of same with parts in section.

Within the hopper are mounted a number of co-acting pairs of measuring and feeding rollers $e$ and from Fig. 2 it will be seen that the rollers are arranged in gangs each on a drum $e^1$ mounted on a shaft $e^2$ there being provided between each roller of a gang a groove $e^3$ into which fits a partition plate $e^4$ which may extend for a suitable height for instance up to the axes of the rollers or to the top of the lower part of the container. There is thus provided a number of separate chambers at the base of the container in which operate a pair of intermeshing rollers, and from Fig. 3 it will be seen that the teeth of said rollers are of relatively large dimensions, and closely intermesh whilst two of the teeth at each side of the axis of the outlet $c$ bear closely against the respective curved surface at the base of the container. The teeth are so designed that they will propel or feed a constant or uniform quantity of chocolate at all points of their contour and the rollers are intermittently rotated as by means to be hereinafter described through varying angles or extents according to the quantity to be fed through the outlet $c$ and die plate $c^1$ according to the quantity to be fed to each mould or mould section, the supply being cut off by the slide $c^2$ between each filling operation. The chocolate is agitated and forced between the rollers by a paddle $h$ carried by arms $h^1$ and operated by lever $h^2$ and rod $h^3$ the latter receiving motion as hereinafter explained.

The mechanism by which the various moving parts are operated is immaterial and may be of any appropriate character but suitable means for the purposes in view are illustrated in the drawings as follows:—

The conveyor chains $a$ are carried by sprockets $f$ $f^1$ and tensioned as by a roller $f^2$ carried by arm $f^3$. Intermittent movement is imparted to the conveyor from the main drive shaft $g$ by gears $g^{10}$ $g^{11}$ through cam $g^1$ on shaft $g^{12}$ adjustable lever and link system $g^2$ $g^3$ and pawl and ratchet feed device $g^4$.

This mechanism is substantially known and is located at each side of the machine, one for the ordinary fed of the conveyor and the other for the "skip" between the moulds.

The extreme positions of the mechanism of which there is one at each side of the machine, are shown in Fig. 1 in full and mainly broken lines respectively. The measuring and feeding rollers $e$ receive intermittent rotation from the shaft $g^{12}$ by means of crank $i$ rod $i^1$ adjustable link and rod system $i^2$ $i^3$ oscillatory disk $i^4$ loose on shaft $i^5$ and carrying a pawl $i^6$ which engages a ratchet wheel $i^7$. On the same shaft as the ratchet wheel is a pinion $j$ with which meshes a spur wheel $j^1$ fast on the shaft $i^5$ on which is also a gear $j^2$ meshing with another gear $j^3$ which in turn meshes with a pinion $j^4$ on the shaft of one gang of rollers and which is geared to another pinion $j^5$ on the shaft of the other gang. The rollers are thus intermittently rotated for extents determined by the adjustable link $i^2$. Upon rotation of the shaft $g^{12}$ (Fig. 1) the oscillatory disc $i^4$, loose on the shaft $i^5$, through crank $i$, rod $i^1$ and adjustable link and rod system $i^2$, $i^3$ is given a counter clockwise movement. A pawl $i^6$ and ratchet $i^7$, both mounted on the disc $i^4$, prevent consequent counter clockwise movement over the spur wheel $j^1$ of the pinion $j$, integral with said ratchet. The spur wheel $j$, therefore, is given a movement similar to that of the disc $i^4$, i. e. counterclockwise, and through gears $j^2$, $j^3$ and pinions $j^4$ and $j^5$, the two sets of rollers $e$ one rotated in the direction of the arrows as indicated in Fig. 3. Upon clockwise rotation of the disc $i^4$, the pinion $j$ will be free to ride over the spur wheel $j^1$ this latter therefore remaining stationary until the next counter clockwise movement of the disc.

The cut off slide $c^2$ is reciprocated in proper time relation with the chain by means of a cam $k$ on shaft $g^{12}$, this cam operating a lever system $k^1$ to which is pivoted a rod $c^4$ connected to said slide. The bell crank is under the action of a spring $k^3$ tending to maintain it in contact with the cam.

The paddle or agitating device $h$ is rocked through rod $h^3$ the lower end of which is connected to an arm $m$ mounted on the same shaft as the adjustable link $i^2$ so that it is moved in synchronism with the rotation of the feed rollers $e$.

There is also shown at the delivery end of the web a discharge device comprising two rollers $l$ one at each side carrying a shaft extending across the chain conveyor or table and mounted in side arms $l^1$. This device is oscillated so that loose pawls $l^9$ ride up over the filled moulds in one direction and force them from the rear (when oscillated in the opposite direction) to discharge the moulds from the chain and table onto a table $n$ or other receiving member. The oscillating movement is produced by a lever $l^2$ rod $l^3$ crank disc $l^4$ train of interrupted gears $l^5$, $l^6$ and spur wheel $l^7$ the latter driven by chain $l^8$ from shaft $g^{12}$.

What I claim as my invention and desire to secure by Letters Patent of the United States is:—

1. In a machine of the character described for depositing quantities of material into molds or the like, the combination of a receptacle for the material, feeding rollers within the receptacle for discharging material therefrom into the molds, intermeshing gears exteriorly of the receptacle for driving the feeding rollers, a gear train for operating the feeding rollers drive gears, pawl and ratchet mechanism for operating the gear train, a freely oscillating disc carrying said pawl and ratchet mechanism and in one direction of movement causing direct operation of certain of gears of the train and in the opposite direction permitting relative overriding of said gears, and adjustable link connections for operating the disc and through the same the pawl and ratchet mechanism to vary the angular movement of the feeding rollers, said feeding rollers having teeth so shaped that in the course of rotation of the rollers engagement between said rollers is always confined to a single tooth of one of the rollers contacting with a portion of the circumference of the other roller.

2. An apparatus for measuring and feeding plastic substance in divided streams comprising in combination a container, a pair of rotatable rollers in said container, said rollers having intermeshing teeth and a plurality of circumferential grooves intersecting said teeth, a base plate having a plurality of discharge nozzles and partitions between said nozzles extending transversely of the axes of the said rollers and engaging severally in the circumferential grooves of the said rollers and extending to said base plate whereby to divide the feed space into several compartments each having its separate discharge nozzle.

In witness whereof I have signed this specification.

WILLIAM EDWARD PRESCOTT.